US009725016B2

(12) United States Patent
Hyder et al.

(10) Patent No.: US 9,725,016 B2
(45) Date of Patent: Aug. 8, 2017

(54) SUPPORTING STRUCTURE OF A SEAT FOR WORKING VEHICLE

(71) Applicant: Yanmar Co., Ltd., Osaka-shi, Osaka (JP)

(72) Inventors: Jarrod Hyder, Adairsville, GA (US); Kazuyuki Kotani, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 269 days.

(21) Appl. No.: 14/318,124

(22) Filed: Jun. 27, 2014

(65) Prior Publication Data

US 2015/0108810 A1 Apr. 23, 2015

Related U.S. Application Data

(60) Provisional application No. 61/892,580, filed on Oct. 18, 2013.

(51) Int. Cl.
| B60N 2/16 | (2006.01) |
| B60N 2/14 | (2006.01) |
| B60N 2/50 | (2006.01) |
| B60N 2/54 | (2006.01) |
| B60N 2/04 | (2006.01) |

(52) U.S. Cl.
CPC .......... B60N 2/1615 (2013.01); B60N 2/045 (2013.01); B60N 2/143 (2013.01); B60N 2/502 (2013.01); B60N 2/507 (2013.01); B60N 2/54 (2013.01)

(58) Field of Classification Search
CPC ........ B60N 2/045; B60N 2/143; B60N 2/502; B60N 2/507; B60N 2/54; B60N 2/1615
USPC ..................................... 297/344.21, 344.22
See application file for complete search history.

(56) References Cited

U.S. PATENT DOCUMENTS

| 3,412,968 A | * | 11/1968 | Rose ..................... | B60N 2/143 |
| | | | | 297/344.22 |
| 4,134,617 A | * | 1/1979 | Matsubara ............ | B60N 2/143 |
| | | | | 297/344.22 X |
| 4,227,670 A | * | 10/1980 | Vander Burgh ....... | B60N 2/143 |
| | | | | 297/344.22 |

FOREIGN PATENT DOCUMENTS

JP 05-229377 9/1993

* cited by examiner

*Primary Examiner* — Anthony D Barfield
(74) *Attorney, Agent, or Firm* — Sterne, Kessler, Goldstein & Fox P.L.L.C.

(57) ABSTRACT

A seat support structure for a working vehicle comprises a fixed plate, a parallel link mechanism, a supporting plate, a rotation shaft, a rotation plate, a seat, a rear upper shaft, and a rotation lock unit. The fixed plate is fixed on a vehicle body of the vehicle. The parallel link mechanism includes a front link and a rear link. The supporting plate is connected to the fixed plate via the parallel link mechanism. The rotation shaft is fixed on a center portion of the supporting plate. The rotation plate is rotatably supported on the rotation shaft. The seat is attached to the rotation plate. The rear upper shaft connects the rear link to the supporting plate. The rotation lock unit is provided on the rear upper shaft.

3 Claims, 7 Drawing Sheets

SUPPORTING STRUCTURE OF A SEAT FOR WORKING VEHICLE

CROSS-REFERENCE TO RELATED APPLICATIONS

This application claims the benefit of U.S. Provisional Application No. 61/892,580, filed on Oct. 18, 2013, which is incorporated by reference in its entirety.

BACKGROUND OF THE INVENTION

Field of the Invention

The present invention relates to a seat supporting structure equipped on a working vehicle.

Related Art

As disclosed by JP H05-229377 A, a well-known conventional tractor referred to as a tractor-loader-backhoe is equipped at a front portion thereof with a front loader, and at a rear portion thereof with a backhoe. This tractor is forward-turned for traveling and for loading and is backward-turned for excavation by the backhoe. Therefore, the tractor includes a seat support structure that pivotally supports an operator's seat on a vertical axis so as to enable the seat to face forward and backward. Further, the tractor has a front footboard for an operator sitting on the forward-facing seat and a rear footboard for an operator sitting on the backward-facing seat, and the front and rear footboards have different heights. Therefore, when the seat is turned to change its forward or backward facing direction, the height of the seat has to be changed. Therefore, the seat support structure includes a parallel link mechanism for translating the seat upward and downward so as to change the height of the seat.

The seat support structure also includes an upper support plate and a lower fixed plate. The seat is rotatably supported on the supporting plate, and the parallel link mechanism is interposed between the supporting plate and the fixed plate. In this regard, the parallel link mechanism includes four parallel links, i.e., right and left front links and right and left rear links. The four parallel links are pivoted at lower ends thereof onto the fixed plate and are pivoted at upper ends thereof onto the supporting plate, so that rotation of the four parallel links changes the height of the supporting plate and the seat relative to the fixed plate.

The seat support structure needs a large space between the supporting plate and the fixed plate and among the four parallel links because this space has to accommodate a height-control means for rotating the parallel links to change the height of the supporting plate relative to the fixed plate, a seat-location means for locating the rotational position of the seat relative to the supporting plate, and a rotation locking means for locking the rotation of the seat relative to the supporting plate. As a result, it is difficult to minimize the seat support structure.

SUMMARY OF THE INVENTION

An object of embodiments disclosed herein is to provide a seat support structure for a working vehicle, wherein the seat support structure can be satisfactorily minimized while the seat support structure ensures both a rotation means for selecting either a forward or backward facing direction of a seat and a parallel link mechanism for changing a height of the seat.

To achieve the object, a seat support structure for a working vehicle according to the invention comprises a fixed plate, a parallel link mechanism, a supporting plate, a rotation shaft, a rotation plate, a seat, a rear upper shaft, and a rotation lock unit. The fixed plate is fixed on a vehicle body of the vehicle. The parallel link mechanism includes a front link and a rear link. The supporting plate is connected to the fixed plate via the parallel link mechanism. The rotation shaft is fixed on a center portion of the supporting plate. The rotation plate is rotatably supported on the rotation shaft. The seat is attached to the rotation plate. The rear upper shaft connects the rear link to the supporting plate. The rotation lock unit is provided on the rear upper shaft.

Therefore, the rotation lock unit provided on the rear upper shaft deviates from the space between the supporting plate and the fixed plate and between the front and rear links, thereby satisfactorily minimizing the space.

Preferably, in the seat supporting structure, the rotation lock unit includes a rotation lock arm, a rotation release lever, and a spring. The rotation lock arm has a protrusion for engaging an engagement hole provided in the supporting plate. The rotation release lever is provided for operating rotation of the rotation lock arm. The rotation release lever is disposed between the supporting plate and the rotation plate in parallel to the supporting plate and the rotation plate. The spring biases the rotation lock arm in the engagement direction.

Therefore, when the seat is lowered, the rotation release lever is compactly disposed between the supporting plate and the rotation plate so that the supporting plate hinders the rotation release lever from unexpectedly rotating further downward to unlock the rotation of the seat.

Preferably, the seat supporting structure further comprises a front supporting shaft, a rear supporting shaft, and a lower lock unit. The front supporting shaft couples the front link with the fixed plate. The rear supporting shaft couples the rear link with the fixed plate. The lower lock unit is disposed between the front supporting shaft and the rear supporting shaft. The lower lock unit includes a lower lock arm that can be engaged with the rear upper shaft.

Therefore, when the seat is lowered, the lower lock unit is compactly disposed in a narrow space between the front links and the rear links. In this state, the lower lock portion comes beside the rotation lock unit so that the lower lock portion and the rotation lock unit are compactly gathered to enable the seat to be satisfactorily lowered.

These, further and other objects, features and advantages of the invention will appear more fully from the following detailed description of the invention with reference to the attached drawings.

BRIEF DESCRIPTION OF THE DRAWINGS

FIG. 7A is a perspective view of the seat and support unit. FIG. 7B is another perspective view of the seat and support unit. FIG.

7C is another perspective view of the seat and support unit. FIG. 7D is yet another perspective view of the seat and support unit.

DETAILED DESCRIPTION OF THE INVENTION

A supporting structure for a seat of a working vehicle according to the present invention can be applied to a seat of a working vehicle such as agricultural machinery and construction machinery to which implements are mountable on front and rear portions of the vehicle body.

Figure 1:
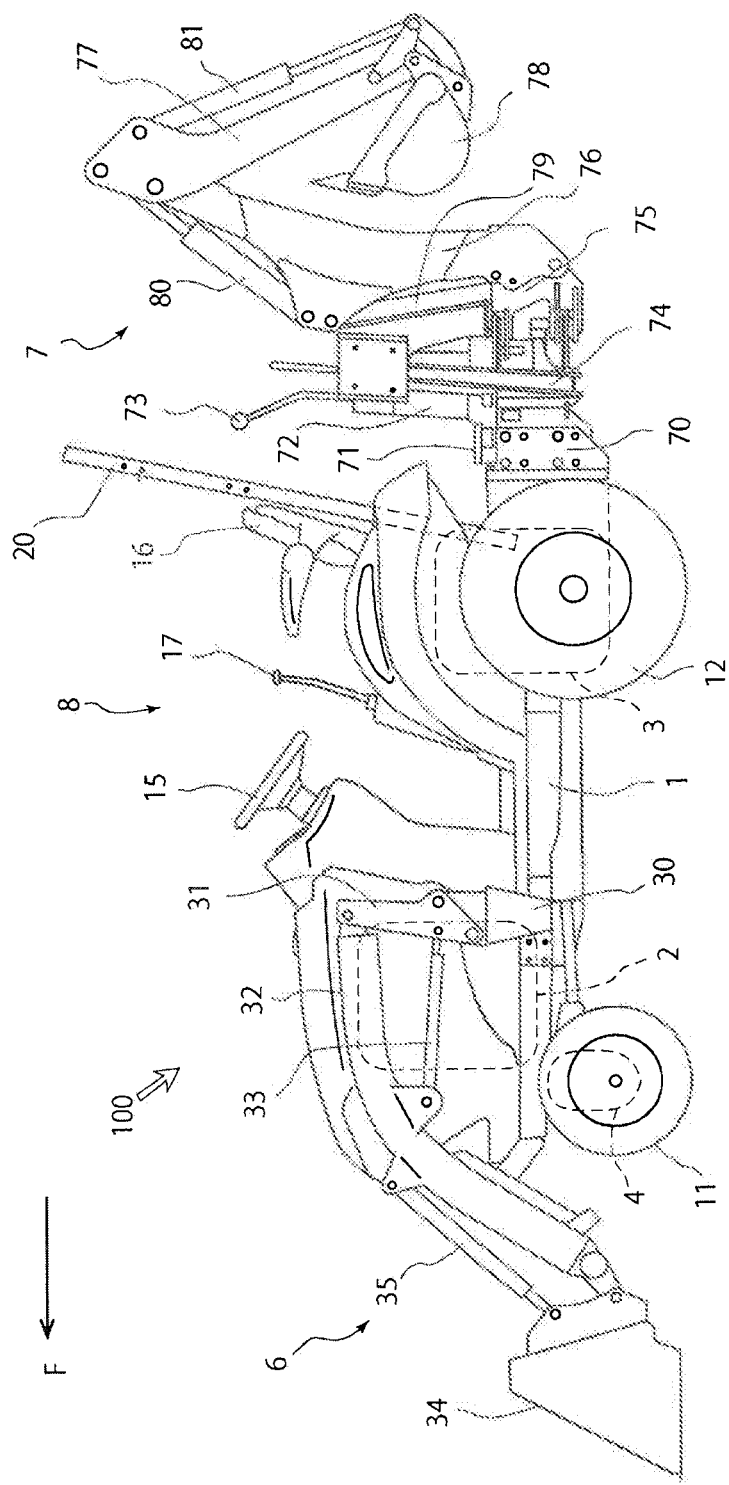
FIG. 1 is a side view of a tractor with a mounted front loader on a front portion and a mounted backhoe on a rear portion.

First, an overall structure of a tractor 100 is described. FIG. 1 shows the overall structure of the tractor 100. In the figure, F indicates the front direction of the tractor 100.

The tractor 100 mainly includes a vehicle body frame 1, an engine 2, a mission casing 3, a front axle casing 4, and a rear axle casing. The tractor 100 includes a front loader 6 on the front portion and a backhoe 7 on the rear portion.

The vehicle body frame 1 serves as the main structure for the tractor 100. The frame structure is not limited, and an engine frame, a clutch housing, and a mission casing may integrally form the vehicle body frame. The vehicle body frame 1 has a shape of a rectangular frame with a pair of left and right longitudinal frames and lateral frames laid between the left and the right longitudinal frames.

The engine 2 is placed and fixed on a front upper portion of the vehicle body frame 1. The front axle casing 4 is attached to a front lower portion of the vehicle body frame 1. The mission casing 3 is attached to a rear portion of the vehicle body frame 1. An operation portion 8 is disposed on the center portion of the vehicle body frame 1 in the front and rear direction.

The engine 2 converts energy obtained by burning a fuel into rotational movement. When an operator operates an acceleration pedal (or an acceleration lever) disposed in the operation portion 8, the engine 2 changes the driving state in accordance with the operation. The engine 2 maintains the rotational speed at a constant level even when the load changes.

The mission casing 3 accommodates a transmission for switching between forward and backward movement of the tractor 100 and shifting the speed of the tractor 100. When the operator operates a shift lever, the operation state of the transmission changes in accordance with the operation. The transmission includes a hydromechanical continuously variable transmission (HMT or I-HMT) as a transmission device. A base portion of a safety frame 20 is attached to a rear portion of the mission casing 3. Alternatively, the safety frame 20 can be attached to the rear axle casing. A PTO output mechanism is provided to the rear portion of the mission casing 3. The rotational energy can be transmitted to an implement through the PTO output mechanism.

The front axle casing 4 accommodates an input shaft, a front differential device, and the like that transmit the rotational energy from the engine 2 to front wheels 11. The rotational energy from the engine 2 is input to the front axle casing 4 through the transmission. The front axle casing 4 is disposed next to a steering device. When the operator operates a handle 15, the steering device changes a steering angle of the front wheels 11 in accordance with the operation. The rear axle casing includes a reducing gear, a rear axle, and the like, and transmits the rotational energy from the engine 2 to rear wheels 12.

The operation portion 8 includes the handle 15, the seat 16, an acceleration lever, a gear lever, an operation lever, a loader lever 17, and the like.

The front loader 6 includes loader struts 31, a loader arm 32, an arm cylinder 33, a bucket 34, and a bucket cylinder 35. The bucket 34 disposed on the front side of the tractor 100 can be rotated upward and downward by the arm cylinder 33 and the bucket cylinder 35. Thus, the bucket 34 can scoop, move, and place soil and the like.

The pair of left and right loader struts 31 stand from attachment brackets 30 fixed on side surfaces at an intermediate portion, of the vehicle body frame 1, in the front and rear direction. The attachment brackets 30 are disposed on front left and right outer sides of the step of the operation portion 8. The loader struts 31 are disposed on the sides of the rear portion of a hood covering the engine 2. The loader struts 31 are attached to upper portions of the attachment brackets 30 in a removable manner. A base portion of the loader arm 32 is supported on the upper portions of the loader struts 31 in a rotatable manner. A base portion of the arm cylinder 33 is supported on an intermediate portion of the loader strut 31 in the upper and lower direction, in a rotatable manner.

The loader arm 32 has a dogleg shape in side view. The base portion of the loader arm 32 is pivotally supported on the upper portion of the loader strut 31. The arm cylinder 33 is interposed between an intermediate portion of the loader arm 32 and the loader strut 31. The loader arm 32 can be moved upward and downward by extending and contracting the arm cylinder 33.

A rear lower portion of the bucket 34 is pivotally supported on a distal end of the loader arm 32. The bucket cylinder 35 is interposed between the rear upper portion of the bucket 34 and an intermediate portion of the loader arm 32 in the front and rear direction. The bucket 34 can be rotated by extending and contracting the bucket cylinder 35.

The backhoe 7 is attached to the rear portion of the mission casing 3 in a removable manner. The backhoe 7 has an attachment frame 70 fixed on a rear surface of the mission casing 3. The upper surface of the attachment frame 70 is a step 71. An operation column 72 stands from a rear portion of the step 71. An operation lever 73, an assist grip, and the like of the backhoe 7 are disposed on the operation column 72.

Outriggers 74 and 74 are attached on left and right side surfaces of a rear portion of the attachment frame 70, and can protrude outwards. A boom bracket 75 is attached to a rear portion of the attachment frame 70 and is rotatable towards left and right. A base portion of a boom 76 is supported on the boom bracket 75 in a rotatable manner. One end of an arm 77 is supported on a distal end of the boom 76 in a rotatable manner. A bucket 78 is supported on a distal end of the arm 77. A boom cylinder 79 is interposed between the boom bracket 75 and an intermediate portion of the boom 76. An arm cylinder 80 is interposed between the intermediate portion of the boom 76 and the arm 77. A bucket cylinder 81 is interposed between the arm 77 and the bucket 78.

Next, a structure of a seat supporting unit 50 for attaching the seat 16 to the mission casing 3 will be described by referring to FIGS. 2 to 6. An attachment plate 52 is secured on the mission casing 3 on the vehicle body side, via supporting stays 51, 51, and 51. Left and right vehicle body side rails (not shown) extending in the front and rear direction, in parallel with one another, are fixed on the attachment plate 52. Seat side rails 54 and 54 are respectively fit on the vehicle body side rails, and can slide in front and rear directions. The seat side rails 54 and 54 are fixed on the lower surface of a fixed plate 55. A front and rear position adjustment mechanism (not shown) is disposed between the vehicle body side rail and the seat side rail 54. The seat 16 can be unlocked and then locked at a desired position by operating an adjustment lever 56 protruding sideways.

The fixed plate 55 is formed of a plate shaped member. Front stays 57 and 57 stand from both left and right sides at an intermediate portion of the fixed plate 55 in the front and rear direction. Rear stays 58 and 58 stand from both left and right sides at a portion more on the rear side than the front stays 57. The distance between the rear stays 58 and 58 in the left and right direction is larger than that between the front stays 57 and 57.

A front supporting shaft 59 extending in the left and right direction is supported between the front stays 57 and 57. One end of each of front links 61 and 61 is pivotally supported on the front supporting shaft 59. A rear supporting shaft 60, extending in parallel with the front supporting shaft 59, is supported between the rear stays 58 and 58. One end of each of rear links 62 and 62 is pivotally supported on the rear supporting shaft 60. The other end of each of the front links 61 and 61 is supported on a corresponding one of front lower stays 65a and 65a, protruding downward from the lower surface of the supporting plate 65, via a front upper shaft 63. The other end of each of the rear links 62 and 62 is supported on a corresponding one of rear lower stays 65b and 65b protruding downward from the lower surface of the supporting plate 65, via a rear upper shaft 64. The front links 61 and 61 have approximately the same shape as the rear links 62 and 62. Thus, the fixed plate 55 and the supporting plate 65 are coupled with one another through the front links 61 and 61 and the rear links 62 and 62 forming a parallel link mechanism. Thus, the supporting plate 65 can be moved upward and downward in a horizontal state.

When the seat 16 is at the lowered position, the front links 61 and 61 are positioned on the outer side of the front lower stays 65a and 65a. The length of the front links 61 and 61 in a short direction is shorter than the vertical height of the front lower stays 65a. When the seat 16 is lowered, the bottom surface of the front lower stay 65a comes into contact with the upper surface of the fixed plate 55. The rear links 62 and 62 are positioned on the outer side of the rear lower stays 65b and 65b. The length of the rear links 62 and 62 in a short direction is shorter than the vertical height of the rear lower stays 65b. When the seat 16 is lowered, the bottom surface of the rear lower stay 65b comes into contact with the upper surface of the fixed plate 55. The height of the front stay 57 is also lower than that of the front lower stay 65a. Thus, when the seat 16 is at the lowered position, the front links 61 and 61 and the rear links 62 and 62 are accommodated between the fixed plate 55 and the supporting plate 65 while extending in a horizontal direction, in a compact manner.

A torsion spring 66 as an elastic member is fit on the rear supporting shaft 60. An intermediate portion of the torsion spring 66 is extended forwardly downward to contact the upper surface of the fixed plate 55. Both ends of the torsion spring 66 are engaged with the rear links 62 and 62. Thus, the torsion spring 66 biases the rear links 62 and 62 in an upward rotating direction (clockwise in FIG. 5).

A torsion spring 67 as an elastic member is fit on the front upper shaft 63. An intermediate portion of the torsion spring 67 is extended rearwardly upward to contact the lower surface of the supporting plate 65. Both ends of the torsion spring 67 are engaged with the front supporting shaft 59. Thus, the torsion spring 67 biases the front links 61 and 61 in an upward rotating direction (clockwise in FIG. 5). Thus, the supporting plate 65 is biased toward the upwardly moving direction by the torsion springs 66 and 67.

A lower lock unit 18 is formed in a center portion of the fixed plate 55. The lower lock unit 18 locks and holds the seat 16 at the lowered position. An unlock operation unit is formed on a front side of the lower lock unit 18. The lower lock unit 18 includes a lower lock arm 84, pins 69, and a spring 88. The pin 69 serves as the rotation axis of the lower lock arm 84. The spring 88 biases the lower lock arm 84 in an engaging direction.

The lower lock arm 84 is supported on left and right stays 68 and 68 suspended from the lower surface of the fixed plate 55 in a rotatable manner, via the pins 69 and 69. The pins 69 and 69 are disposed in parallel with one another below the rear upper shaft 64.

The lower lock arm 84 is disposed to vertically penetrate an attachment hole 55a formed in an approximately center portion of the fixed plate 55. The lower lock arm 84 is formed by bending a plate material into a rectangular U shape in plan view. Lower portions of left and right vertical surfaces of the lower lock arm 84 are supported on the pins 69 and 69 in a rotatable manner. A hook portion 84a is formed in an upper portion of the lower lock arm 84. The rear upper shaft 64 can be engaged with the hook portion 84a.

A coupling plate 84b is fixed on a front surface of the lower lock arm 84 at a center portion in the left and right direction. One end of a coupling rod 85 is coupled to an upper portion of the coupling plate 84b. The other end of the coupling rod 85 extends toward the front to be coupled to a lower unlocking lever 87 via the arm 86. The coupling rod 85 is formed by bending to have an L shape in side view. The one end of the coupling rod 85 extends upward to penetrate the attachment hole 55a and to be pivotally coupled to the coupling plate 84b. The other end of the coupling rod 85 extends forward along the lower surface of the fixed plate 55 to be pivotally coupled to a lower portion of the arm 86. One end of the lower unlocking lever 87 is fixed to the arm 86 and is supported on a front portion of the fixed plate 55 in a rotatable manner. The other end of the lower unlocking lever 87 extends to a front lower portion of the seat 16.

One end of the spring 88 formed of a tension spring as a biasing member is engaged with a lower portion of the coupling plate 84b. The other end of the spring 88 extends forward to be engaged with an engagement piece 89 protruding downwards from a front portion of the fixed plate 55. Thus, the spring 88 biases the hook portion 84a of the lower lock arm 84 in a direction to be engaged with the rear upper shaft 64.

In this structure, when the lower unlocking lever 87 is rotated upward, the coupling rod 85 is pulled forward via the arm 86. Thus, the lower lock arm 84 rotates towards the front so that the hook portion 84a and the rear upper shaft 64 are disengaged. The front links 61 and 61 and the rear links 62 and 62 are rotated upward by the biasing force of the torsion springs 66 and 67. Thus, the seat 16 can be raised. The lower lock unit 18 is disposed at a position surrounded by the front supporting shaft 59, the rear supporting shaft 60, the front links 61 and 61, and the rear links 62 and 62. The coupling rod 85 and the spring 88 of the unlocking operation unit extend forward below the fixed plate 55 and can be disposed in a compact manner without interfering with the front supporting shaft 59 and the front upper shaft 63.

An upper lock unit 19 is formed at a position higher than the lower lock unit 18 in the rear portion of the fixed plate 55. The upper lock unit 19 includes upper lock arms 90, an arm shaft 91, spring 92, an arm bracket 107, a handle 93, and the like. Both sides of the arm shaft 91 are supported on the left and the right rear stays 58 and 58 standing on the rear portion of the fixed plate 55, in a rotatable manner. The upper lock arms 90 and 90 are fixed on the arm shaft 91 between the rear stays 58 and 58. The arm bracket 107 is fixed on the left and the right upper lock arms 90 and 90. A base portion of the handle 93 extending rearward is fixed on the arm bracket 107.

A lower portion of the upper lock arm 90 is fixed on the arm shaft 91, and a hook portion 90a with a front side opened is formed at an upper portion of the upper lock arm 90. An engagement pin 62a protrudes towards the center portion of the vehicle body in the left and right direction (horizontal direction) from an intermediate portion of the rear link 62 in the longitudinal direction. When rotated upward (when the seat 16 is in the raised position), the engagement pin 62a engages with the hook portion 90a.

The spring 92 formed of a torsion spring is fit on to the arm shaft 91. One end of the spring 92 is engaged with the rear stay 58, and the other end of the spring 92 is engaged with the arm bracket 107. Thus, the upper lock arms 90 are biased to rotate in the engaging direction.

In such a structure, the engagement pins 62a and 62a engage with the hook portions 90a and 90a of the upper lock arms 90 and 90, when the seat 16 is in the raised position (position illustrated by a dotted-dashed line in FIG. 2, see FIGS. 7b to 7d) with the front links 61 and the rear links 62 rotated upward from the horizontal state to exceed the top dead center. When the handle 93 is pushed down in this state, the upper lock arms 90 and 90 are rotated rearward so that the engagement pins 62a and 62a and the hook portions 90a and 90a are disengaged. Thus, the seat 16 can be moved in a front lower direction.

A rotation shaft 94 stands from a center portion of the upper surface of the supporting plate 65. The rotation shaft 94 fits a rotation shaft bearing (not shown) formed in the center of a rotation plate 95 in a rotatable manner. Alternatively, a rotation shaft may protrude downward from the center portion of the lower surface of the rotation plate 95, and a rotation shaft bearing may be formed in the center of the supporting plate 65.

Figure 6:
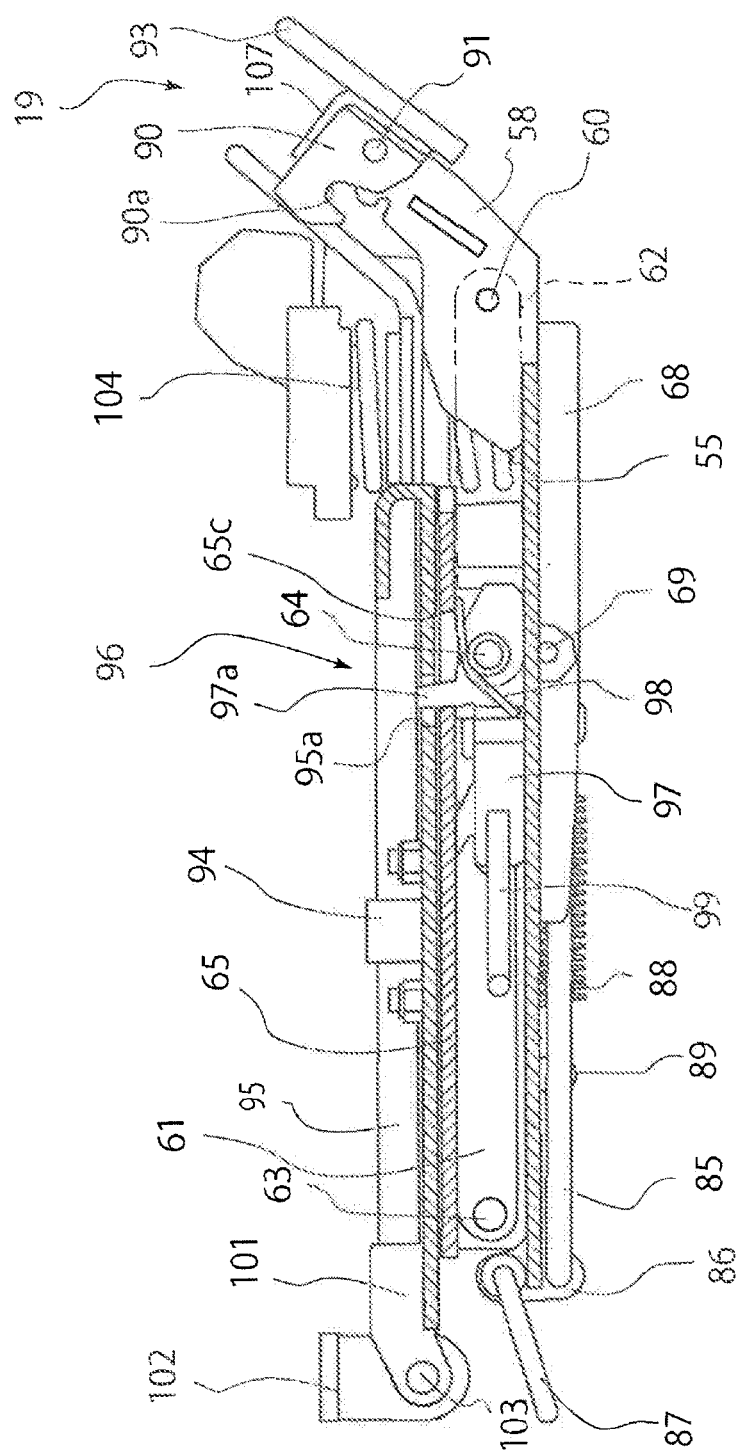
FIG. 6 is a side cross-sectional view of a rotation lock unit.

A rotation lock unit 96 is disposed between the supporting plate 65 and the rotation plate 95. The seat 16 is locked to face forward or backward by the rotation lock unit 96. The rotation lock unit 96 is disposed on the left side of the lower lock unit 18. As shown in FIGS. 4 and 6, the rotation lock unit 96 includes a rotation lock arm 97, a spring 98 exerting biasing force in the locking direction, a rotation release lever 99, and engagement holes 95a and 95b formed in the rotation plate 95 (see FIG. 3).

The rotation lock arm 97 is formed by bending a plate material into a crank form in plan view. A shaft hole is formed in a rear portion of the rotation lock arm 97 and is fit on to the rear upper shaft 64 in a rotatable manner. A protrusion 97a protrudes upward from a position more on the front side than the shaft hole in the rear portion of the rotation lock arm 97. The protrusion 97a protrudes through a communication hole 65c formed in the supporting plate 65 to engage with the engagement hole 95a (95b) formed in the rotation plate 95. The protrusion 97a engages with the engagement hole 95a when the seat 16 is facing forward, and engages with the engagement hole 95b when the seat 16 is facing backward. Thus, the engagement hole 95a and the engagement hole 95b are disposed at positions where phases are different from each other by 180 degrees with respect to the rotation shaft 94.

One end of the rotation release lever 99 is fixed to a front portion of the rotation lock arm 97. The rotation release lever 99 is bent to have an L shape in plan view, and is disposed to have the other end (distal end) protruding toward the left. The rotation release lever 99 and the rotation lock arm 97 are horizontally disposed. The widths of the rotation release lever 99 and the rotation lock arm 97 (excluding the protrusion 97a) in the short direction (height) are smaller than the widths of the front and the rear links 61 and 62 in the short direction. When the seat 16 is at the lowered position, the rotation release lever 99 is positioned between the fixed plate 55 and the supporting plate 65 so as to be unable to rotate upward or downward. In short, the seat 16 in the lowered position disables the unlocking.

The spring 98 is formed of a torsion spring, and is fit on to the rear upper shaft 64. One end of the spring 98 is in contact with the lower surface of the supporting plate 65. The other end of the spring 98 engages with the rotation lock arm 97. Thus, the spring 98 biases the rotation lock arm 97 and the rotation release lever 99 to rotate upward (clockwise rotation direction in FIG. 6), that is, in such a direction to make the protrusion 97a engage with the engagement hole 95a or 95b.

Figure 2:
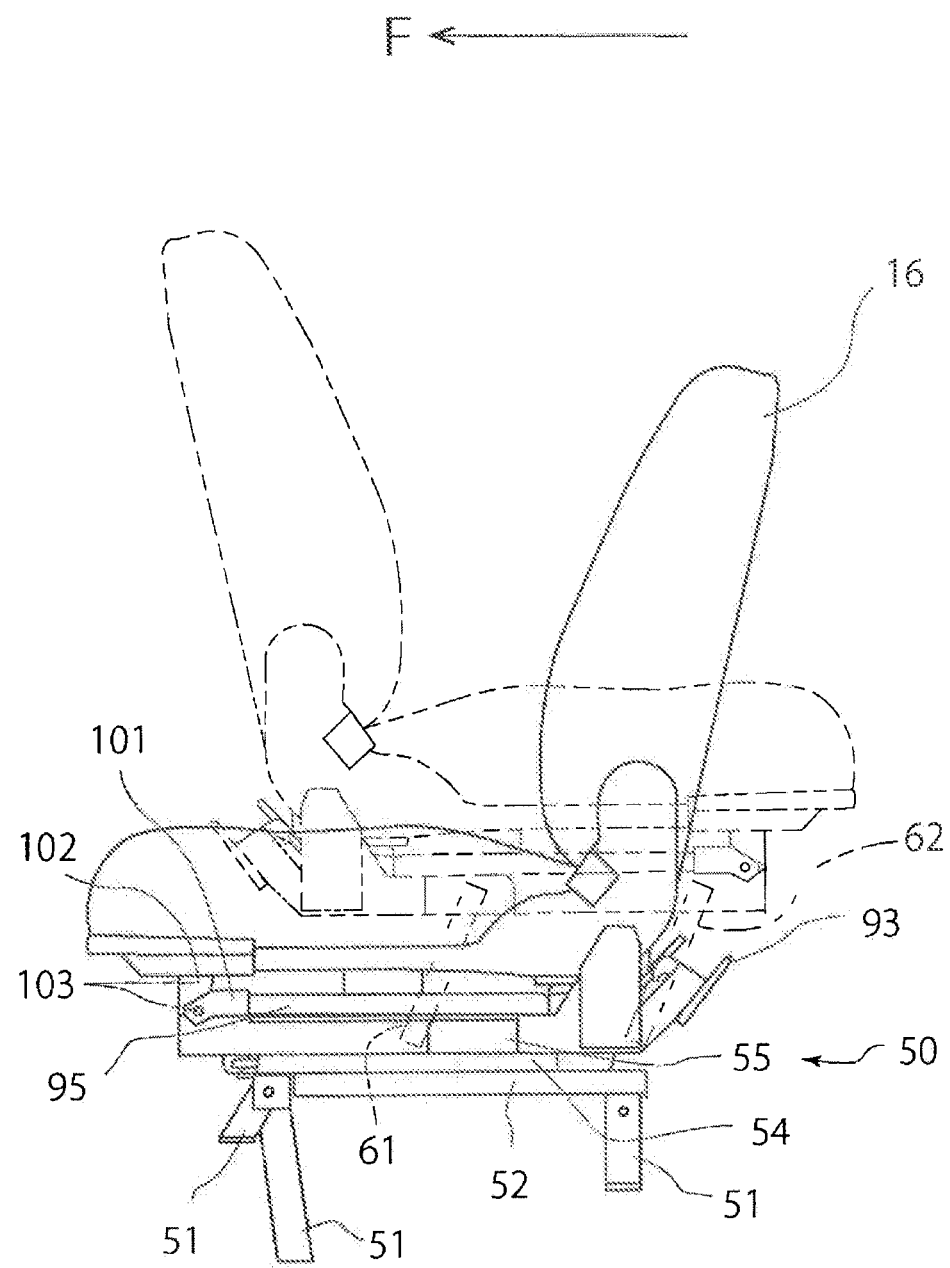
FIG. 2 is a side view of a seat and a seat supporting unit.
Figure 3:
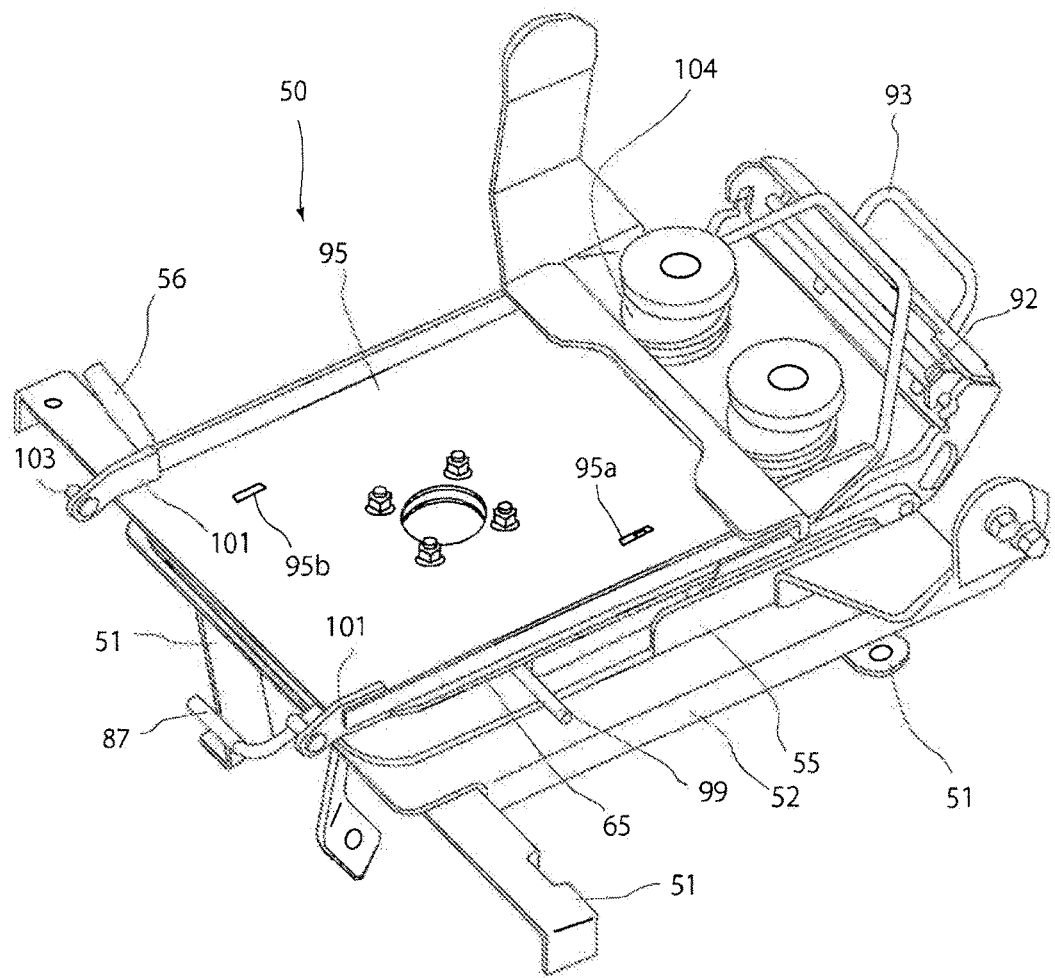
FIG. 3 is a perspective view of the seat supporting unit.
Figure 4:
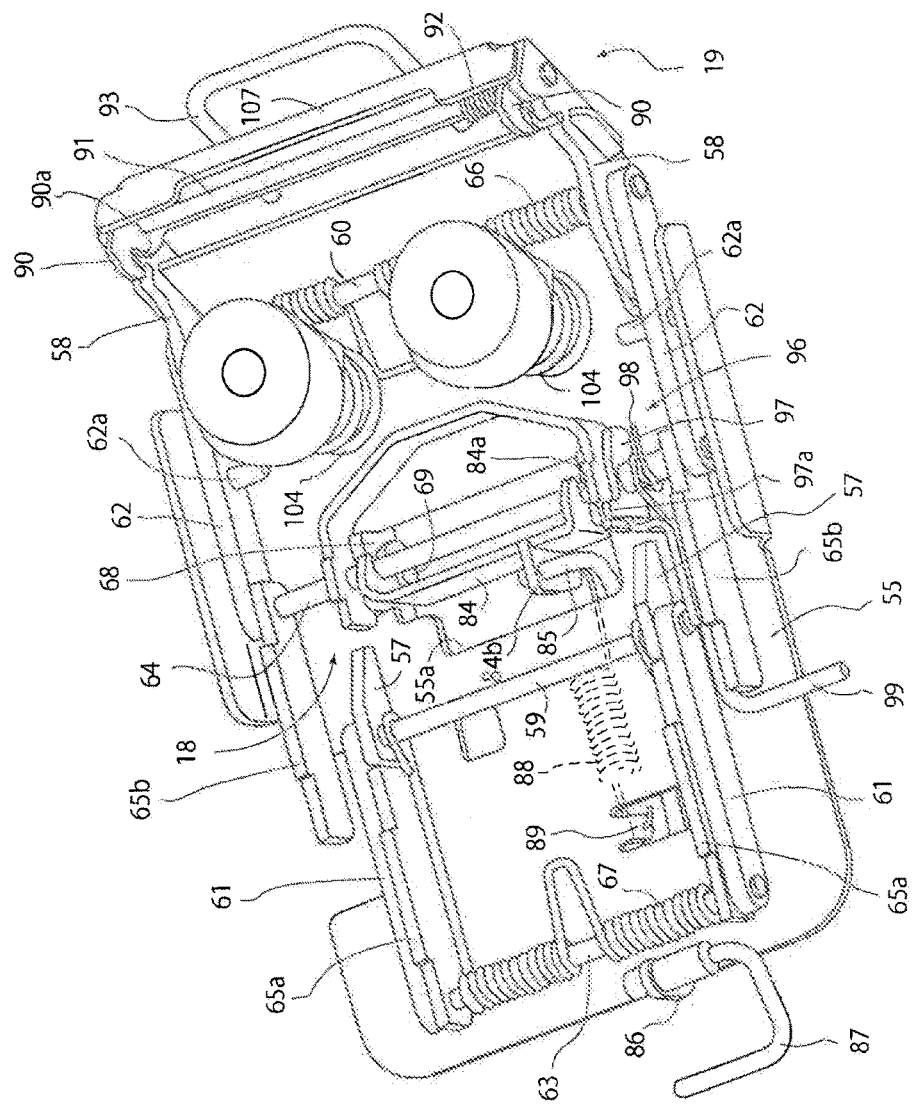
FIG. 4 is a perspective view of the seat supporting unit without a supporting plate and a rotation plate.
Figure 5:
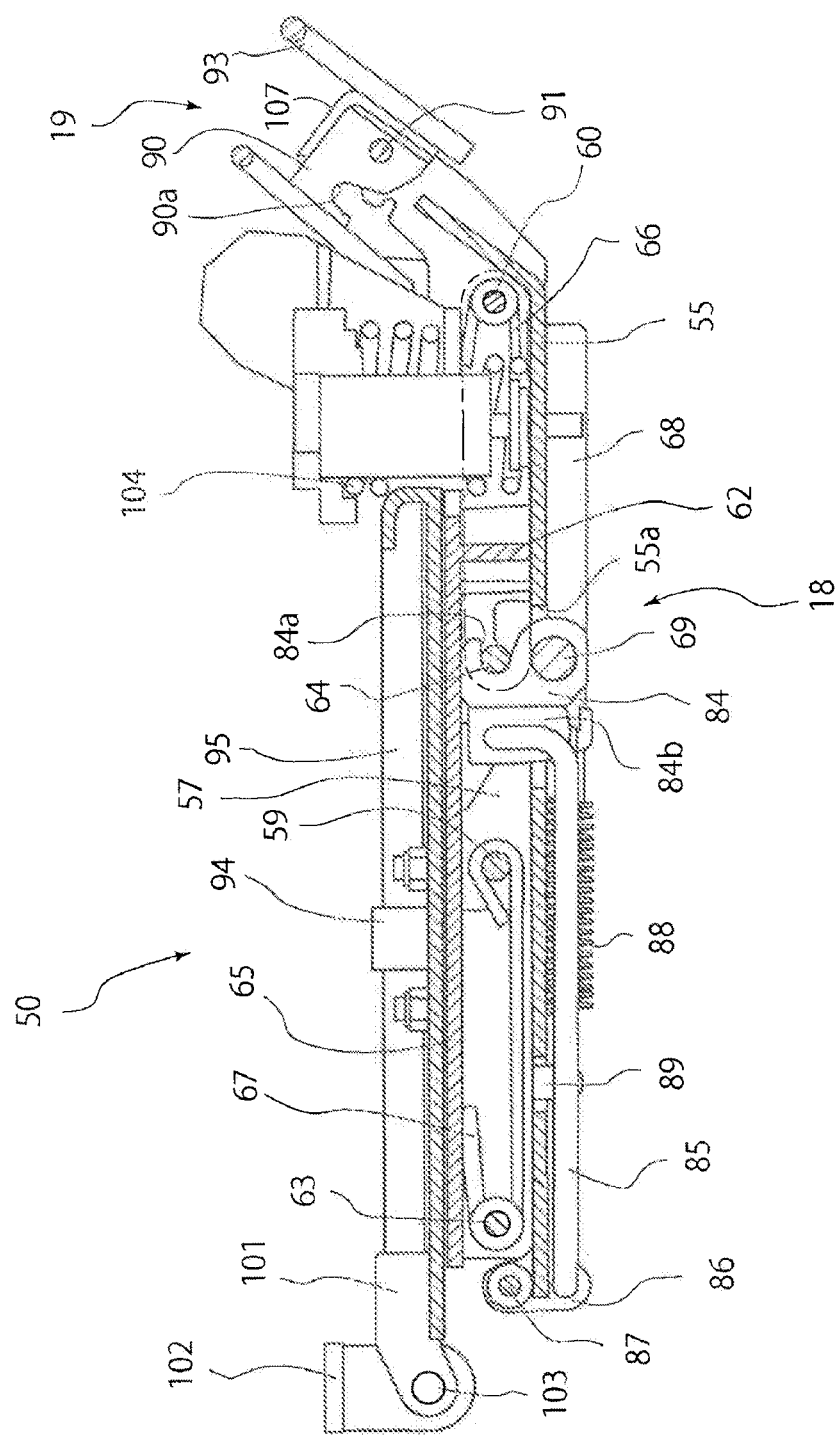
FIG. 5 is a side cross-sectional view of a lower lock unit.

As shown in FIGS. 2, 3 and 5, left and right supporting plates 101 and 101 protrude forward from the front portion of the rotation plate 95. Front supporting plates 102 and 102 are supported on the supporting plates 101 and 101, in a rotatable manner, by shafts 103 and 103. The front supporting plates 102 and 102 downwardly protrude from both left and right sides of a front lower portion of the seat 16. A shaft center of the shaft 103 extends in the left and right horizontal direction. Thus, the seat 16 can be rotated in an upper forward direction. Left and right cushion springs 104 and 104 are disposed in parallel on the rear portion of the fixed plate 55. The cushion springs 104 and 104 receive a rear lower surface of the seat 16 at the lowered position. Thus, while the vehicle is driven and the loader is operated, the cushion springs 104 and 104 absorb the vibration to the seat 16, whereby the driver can more comfortably operate the vehicle.

In such a structure, when the rotation release lever 99 is rotated downward while the seat 16 is at the raised position, the protrusion 97a is rotated toward the front lower side to be pulled out from the engagement hole 95a. Thus, the rotation plate 95 becomes rotatable. When the seat 16 is rotated about the rotation shaft 94 to face backward in this state, the protrusion 97a is rotated to the position of the engagement hole 95b to be engaged therewith since the spring 98 is biasing the rotation lock arm 97 to turn upward. Thus, the rotation plate 95 is locked to be unable to rotate as long as the rotation release lever 99 is untouched.

Figure 7A:
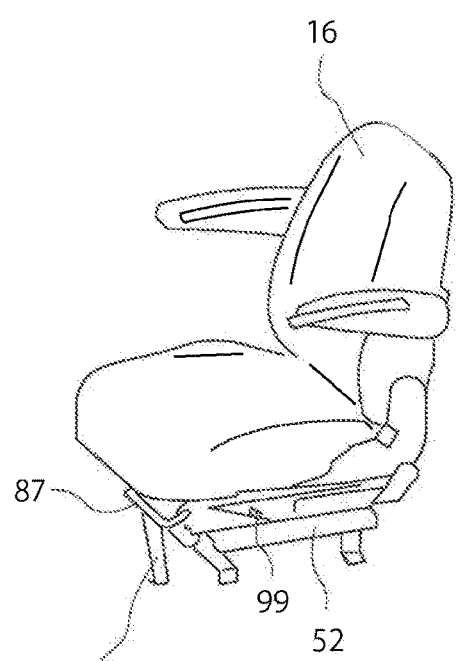
FIGS. 7A-7D are perspective views of the seat and the seat support unit, showing a process of changing the seat from a lowered position to a raised position.
Figure 7B:
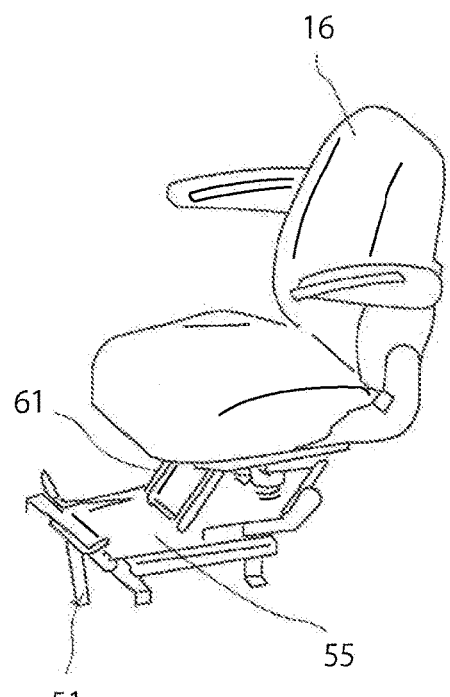

Next, a process of changing the seat 16 from the lowered position to the raised position will be described with reference to FIGS. 7A-7D. The seat 16 is at the lowered position and faces forward as shown in FIG. 7A when the vehicle is driven, when the loader is operated, and the like. Then, when excavating or the like is to be performed with the backhoe 7, the lower unlocking lever 87 is pulled upward. Thus, the lower lock arm 84 and the rear upper shaft 64 are disengaged, whereby the seat 16 is raised by the biasing force of the torsion springs 66 and 67 as shown in FIG. 7B. The hook portion 90a of the upper lock arm 90 engages with the engagement pin 62a of the rear link 62 at the rear end raised position. As a result, the seat 16 is held at the raised position.

Figure 7C:
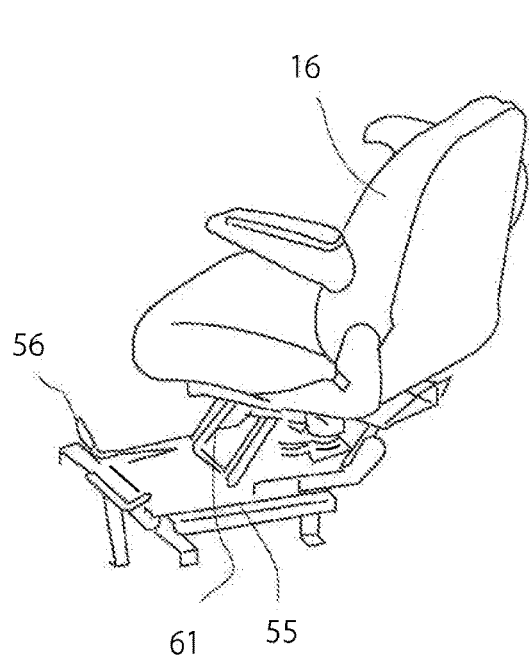

When the rotation release lever 99 is rotated downward in this state, the protrusion 97a of the rotation lock arm 97 is released from the engagement hole 95a, so that the seat 16 can be rotated as shown in FIG. 7C. When the seat 16 is at the lowered position, the rotation release lever 99 is stopped by the fixed plate 55 and thus cannot be operated. Thus, the seat 16 does not rotate even when the rotation release lever 99 is accidentally touched.

Figure 7D:
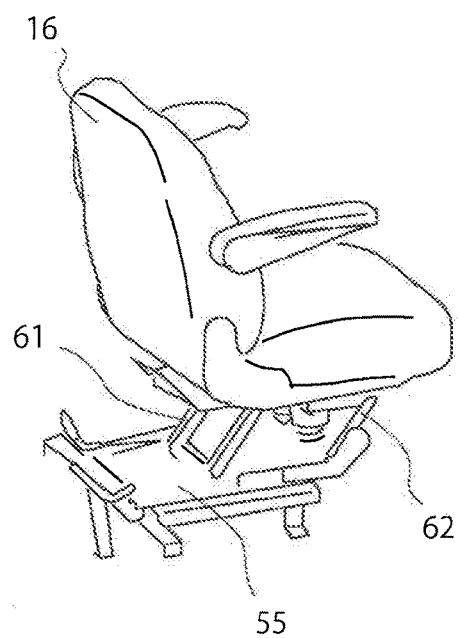

When the seat 16 rotates to a position to face backward as shown in FIG. 7D, the protrusion 97a of the rotation lock arm 97 engages with the engagement hole 95b so that the seat 16 is held at the position facing backward. Thus, a state is achieved where the seat 16 is at the raised position facing backward so that the backhoe 7 can be operated.

When the seat 16 changes from the backhoe 7 operation position to the normal front facing position, the rotation release lever 99 is operated in the state of FIG. 7D. Thus, the protrusion 97a of the rotation lock arm 97 is disengaged from the engagement hole 95b. Then, when the seat 16 is rotated to face forward as shown in FIG. 7B from the state of FIG. 7C, the protrusion 97a of the rotation lock arm 97 engages with the engagement hole 95a, and thus the seat 16 is held at the position facing forward. Then, the handle 93 of the upper lock unit 19 is pushed down so that the hook portions 90a of the upper lock arm 90 are disengaged from the engagement pins 62a of the rear link 62, and the seat 16 is moved toward the front lower side. When the seat 16 is lowered to the position shown in FIG. 7A, the lower lock arm 84 engages with the rear upper shaft 64. Thus, the seat 16 can be held at the lowered position.

As described above, in the supporting structure for the seat 16 of a working vehicle, in which the supporting plate 65 is coupled to the fixed plate 55 fixed to the vehicle body side, via the parallel link mechanism including the pair of left and right front links 61 and 61 and the pair of left and right rear links 62 and 62, and the rotation plate 95, to which the seat 16 is attached, is supported on the rotation shaft 94 fixed at the center of the supporting plate 65, so as to be capable of rotating to face front and back, the rotation lock unit 96 is disposed on the rear upper shaft 64 coupling the rear links 62 and 62 to the supporting plate 65. Thus, the rotation lock unit 96 can be disposed in a small space. Therefore, the space below the seat 16 can be prevented from being large, whereby a compact supporting structure for the seat 16 can be achieved.

The rotation lock unit 96 includes the rotation lock arm 97 including the protrusion 97a configured to engage with the engagement hole 95a or 95b of the rotation plate 95, the rotation release lever 99 configured to operate and rotate the rotation lock arm 97, and the spring 98 configured to bias the rotation lock arm 97 in the engaging direction. The rotation release lever 99 is disposed in parallel with and between the supporting plate 65 and the rotation plate 95. Thus, the rotation release lever 99 is disposed in a small space between the supporting plate 65 and the rotation plate 95 in a compact manner when the seat 16 is in the lowered state. In this state, the rotation release lever 99 is stopped by the supporting plate 65 and thus cannot be rotated downward. Thus, the seat 16 does not rotate even when the rotation release lever 99 is accidentally operated. Therefore, the driving operation is not deteriorated.

The lower lock unit 18 is disposed between the front supporting shaft 59 and the rear supporting shaft 60 that couple the front links 61 and 61 and the rear links 62 and 62 with the fixed plate 55. The lower lock arm 84 as a component of the lower lock unit 18 is configured to be capable of engaging with the rear upper shaft 64. Thus, when the seat 16 is in the lowered state, the lower lock unit 18 can be disposed in a small space between the front links 61 and 61 and the rear links 62 and 62, in a compact manner. The lower lock unit 18 is disposed on the side of the rotation lock unit 96. Thus, the lower lock unit 18 and the rotation lock unit 96 can be disposed in the small space in a concentrated manner, whereby the seat 16 can be disposed at a low position.

What is claimed is:

1. A seat supporting structure for a working vehicle, comprising:
    a fixed plate fixed on a vehicle body of the vehicle;
    a parallel link mechanism including a front link and a rear link;
    a supporting plate disposed above the fixed plate and connected to the fixed plate via the parallel link mechanism;
    a rotation shaft fixed on a center portion of the supporting plate;
    a rotation plate rotatably supported on the rotation shaft;
    a seat attached to the rotation plate;
    a rear upper shaft connecting the rear link to the supporting plate; and
    a rotation lock unit provided on the rear upper shaft, the rotation lock unit comprising a rotation release lever for selectively allowing rotation of the rotation plate, the rotation release lever being disposed between the fixed plate and the supporting plate in parallel to the fixed plate and the supporting plate,
        wherein the rotation release lever is not rotatable to allow rotation of the rotation plate when the supporting plate is disposed at a lowered position close to the fixed plate, and
        wherein the rotation release lever is rotatable to allow rotation of the rotation plate when the supporting plate is disposed at a raised position away from the fixed plate.

2. The seat supporting structure according to claim 1, wherein the rotation lock unit further comprises:
    a rotation lock arm having a protrusion for engaging an engagement hole provided in the supporting plate rotation release lever operates rotation of the rotation lock arm to release the protrusion from the engagement hole; and
    a spring for biasing the rotation lock arm in an engagement direction.

3. The seat supporting structure according to claim 1, further comprising:
    a front supporting shaft coupling the front link with the fixed plate;
    a rear supporting shaft coupling the rear link with the fixed plate; and
    a lower lock unit disposed between the front supporting shaft and the rear supporting shaft, wherein the lower lock unit includes a lower lock arm that can be engaged with the rear upper shaft.

* * * * *

UNITED STATES PATENT AND TRADEMARK OFFICE
CERTIFICATE OF CORRECTION

PATENT NO. : 9,725,016 B2
APPLICATION NO. : 14/318124
DATED : August 8, 2017
INVENTOR(S) : Hyder et al.

Page 1 of 1

It is certified that error appears in the above-identified patent and that said Letters Patent is hereby corrected as shown below:

In the Claims

In Column 10, Line 45, Claim 2, delete "plate" and insert -- plate, wherein the --, therefor.

Signed and Sealed this
Tenth Day of April, 2018

Andrei Iancu
*Director of the United States Patent and Trademark Office*